United States Patent [19]

Cusumano et al.

[11] Patent Number: 5,854,186
[45] Date of Patent: *Dec. 29, 1998

[54] LUBRICATING OIL DISPERSANTS DERIVED FROM HEAVY POLYAMINE

[75] Inventors: Joseph V. Cusumano, Watchung; David C. Dankworth, Whitehouse Station; William D. Diana, Belle Mead; William B. Eckstrom, Fanwood, all of N.J.; Jacob I. Emert, Brooklyn, N.Y.; Keith R. Gorda, Little York, N.J.; Antonio Gutierrez, Mercerville, N.J.; Jon E. Stanat, Westfield, N.J.; Warren A. Thaler, Flemington, N.J.; Stephen Zushma, Clinton, N.J.

[73] Assignee: Exxon Chemical Patents, Inc., Wilmington, Del.

[ * ] Notice: The term of this patent shall not extend beyond the expiration date of Pat. No. 5,792,730.

[21] Appl. No.: 820,250

[22] Filed: Mar. 18, 1997

Related U.S. Application Data

[62] Division of Ser. No. 261,554, Jun. 17, 1994.

[51] Int. Cl.⁶ .................... C10M 159/12; C10M 149/14; C10M 133/52
[52] U.S. Cl. ............................ 508/554; 508/543
[58] Field of Search ...................... 508/554, 543

[56] References Cited

U.S. PATENT DOCUMENTS

| | | | |
|---|---|---|---|
| 3,711,406 | 1/1973 | Lowe | 252/33.4 |
| 3,803,087 | 4/1974 | Vaughn | 260/47 |
| 4,088,588 | 5/1978 | Pecoraro | 508/554 |
| 4,108,945 | 8/1978 | Fetters | 260/880 B |
| 4,152,499 | 5/1979 | Boerzel | 526/52.4 |
| 4,579,674 | 4/1986 | Schlicht | 252/51.5 A |
| 4,713,188 | 12/1987 | Wollenberg | 252/51.5 A |
| 4,732,942 | 3/1988 | Liu et al. | 525/301 |
| 4,840,744 | 6/1989 | Wollenburg et al. | 252/51.5 A |
| 4,927,551 | 5/1990 | Erdman | 252/42.7 |
| 4,938,881 | 7/1990 | Ripples | 252/32.7 E |
| 4,952,739 | 8/1990 | Chen | 585/18 |
| 5,049,294 | 9/1991 | Van Zon | 252/51.5 A |
| 5,053,152 | 10/1991 | Steckel | 252/51.5 R |
| 5,070,131 | 12/1991 | Rhodes | 524/484 |
| 5,114,435 | 5/1992 | Abramo | 44/348 |
| 5,160,648 | 11/1992 | Steckel | 252/47.5 |
| 5,164,101 | 11/1992 | Brownawell | 252/25 |
| 5,171,466 | 12/1992 | Korosec | 252/51.5 A |
| 5,230,714 | 7/1993 | Steckel | 44/432 |
| 5,232,616 | 8/1993 | Harrison et al. | 252/51.5 A |
| 5,241,003 | 8/1993 | Degonia | 525/123 |
| 5,334,321 | 8/1994 | Harrison et al. | 252/51.5 A |
| 5,356,552 | 10/1994 | Harrison et al. | 252/51.5 A |
| 5,629,434 | 5/1997 | Cusumano et al. | 508/469 |
| 5,643,859 | 7/1997 | Gutierrez et al. | 508/454 |

FOREIGN PATENT DOCUMENTS

| | | | |
|---|---|---|---|
| 0 148 592 A3 | 7/1985 | European Pat. Off. | C08F 8/00 |
| 0 475 609 A1 | 3/1992 | European Pat. Off. | |
| 0 556 915 A2 | 8/1993 | European Pat. Off. | C08F 8/00 |
| 25 45 958 | 10/1975 | Germany . | |
| 2231873 | 11/1990 | United Kingdom | C08F 8/46 |
| WO94/13709 | 6/1994 | WIPO | C08F 8/00 |
| WO94/20548 | 9/1994 | WIPO | C08F 8/00 |

*Primary Examiner*—Jerry D. Johnson
*Attorney, Agent, or Firm*—Ohlandt, Greeley, Ruggiero & Perle

[57] ABSTRACT

A Koch functionalized product, which is the reaction product of at least one hydrocarbon with carbon monoxide and a nucleophilic trapping agent is derivatized with a heavy polyamine. A heavy polyamine is a mixture of polyamines comprising small amounts of lower polyamine oligomers such as tetraethylene pentamine and pentahexamine but primarily oligomers with more than 6 nitrogens and more extensive branching.

10 Claims, No Drawings

LUBRICATING OIL DISPERSANTS DERIVED FROM HEAVY POLYAMINE

This is a division of application Ser. No. 08/261,554, filed Jun. 17, 1994, now pending.

FIELD OF THE INVENTION

The invention relates to dispersant additives comprising polymeric amides prepared from functionalized hydrocarbon polymers reacted (e.g. derivatized) with "heavy polyamines". "Heavy polyamine" as referred to herein is a mixture of higher oligomers of ethylene amines containing essentially no tetraethylene pentamine, small amounts of pentaethylenehexamine but primarily oligomers with more than 6 nitrogens and more branching. Use of heavy polyamine allows for incorporation of greater amounts of nitrogen into the dispersant molecule than prior art amines. The polymeric amide dispersants disclosed herein are useful as additives in fuel and lubrication oils.

The term "hydrocarbon" is used herein to refer to both nonpolymeric compounds comprising hydrogen and carbon as well as materials comprising large molecules built up by the repetition of small, simple chemical units. When only several such units are linked, the resulting composition is sometimes referred to as an oligomer, whereas the linking of many units is typically referred to as a polymer; there is no "bright line" distinguishing oligomers and low molecular weight polymers. In a hydrocarbon polymer those units are predominantly formed of hydrogen and carbon. Nonpolymeric compounds typically have uniform properties such as molecular weight ($M_n$), although this term can be applied to both polymeric and nonpolymeric compositions. The term hydrocarbon is not intended to exclude mixtures of such compounds which individually are characterized by uniform properties.

Such hydrocarbon compounds have been reacted to form carboxyl group-containing compounds and their derivatives. Carboxyl groups have the general formula —CO—OR, where R can be H, a hydrocarbyl group, or a substituted hydrocarbyl group.

BACKGROUND OF THE INVENTION

U.S. Ser. No. 992,403 discloses amidation (derivatization) of polymers functionalized by the Koch reaction with amine and is incorporated by reference herein.

U.S. Ser. No. 261,507 Amidation of Ester Functionalized Polymers; U.S. Ser. No. 261,557, Prestripped Polymer Used to Improve Koch Reaction Dispersant Additives; U.S. Ser. No. 261,559, Batch Koch Carbonylation Process; U.S. Ser. No. 261,534, Derivatives of Polyamines With One Primary Amine and Secondary or Tertiary Amines: U.S. Ser. No. 261,560, Continuous Process for Production of Functionalized Olefins; and U.S. Ser. No. 261,558, Functionalized Additives Useful In Two-Cycle Engines, all filed Jun. 17, 1994, all contain related subject matter as indicated by their titles and are hereby incorporated by reference in their entirety for all purposes.

Polyalkenyl succinimides are a widely used class of dispersants for lubricant and fuels applications. They are prepared by the reaction of, for example, polyisobutylene with maleic anhydride to form polyisobutenyl-succinic anhydride, and then a subsequent condensation reaction with ethylene amines.

EP-A 0 475 609 Al discloses the use of "heavy polyamine" which is disclosed to be a mixture of poiyethyleneamines sold by Union Carbide Co. under the designation Polyamine HPA-X.

U.S. Pat. No. 5,230,714 discloses the use of "polyamine bottoms" derived from an alkylene polyamine mixture. "Polyamine bottoms" are characterized as having less than two, usually less than 1% by weight of material boiling below about 200° C. In the case of ethylene polyamine bottoms, the bottoms were disclosed to contain less than abut 2% by weight total diethylene triamine (DETA) or triethylene tetraamine (TETA). A typical sample of such ethylene polyamine from Dow Chemical Company, designated as "E-100" was disclosed to have a percent nitrogen by weight of 33.15 and gas chromatography analysis showed it to contain about 0.93% "Light Ends" (DETA), 0.72% TETA, 21.74% tetraethylene pentamine and 76.61% pentaethylene hexamine and higher (by weight).

U.S. Pat. No. 4,938,881 similarly discloses the use of "polyamine bottoms".

U.S. Pat. No. 5,164,101 discloses the polybutenylsuccinimide of polyamines, wherein the polyamine has a specific formula.

U.S. Pat. No. 5,114,435 discloses a polyalkylenesuccinimide prepared from a polyalkylenesuccinnic acid or anhydride reacted with a polyalkylene polyamine of a specific formula. Hexaethylene heptamine is disclosed to be a suitable amine.

U.S. Pat. No. 4,927,551 discloses a polybutenyl succinnic anhydride reacted with Dow E-100 heavy polyamine (average Mw=303 available from Dow Chemical Company).

U.S. Pat. No. 5,241,003 discloses succinimides derived from amines of a specific formula. Various suitable low cost polyethylene polyamine mixtures are disclosed to be available under various trade designations such as "Polyamine H", "Polyamine 400", "Dow Polyamine E-100" and "Dow S-1107".

SUMMARY OF THE INVENTION

The present invention relates to dispersant additives comprising polymeric amides prepared from functionalized hydrocarbon polymers reacted (e.g. derivatized) with "heavy polyamines". "Heavy polyamine" as referred to herein is a mixture of higher oligomers of ethylene amines containing essentially of no tetra ethylene pentamine, small amounts of pentaetylenehexamine but primarily oligomers with more than 6 nitrogens and more branching. The polymeric amides dispersants disclosed herein are useful as additives in fuel and lubricating oils.

A functionalized hydrocarbon of less than 500 $M_n$ wherein functionalization comprises at least one group of the formula —CO—Y—$R^3$ wherein Y is O or S; $R^3$ is aryl, substituted aryl or substituted hydrocarbyl; and —Y—$R^3$ has a pKa of 12 or less and wherein at least 50 mole % of the functional groups are attached to a tertiary carbon atom; and a process for producing such functionalized hydrocarbon, Also disclosed are derivatized hydrocarbon dispersants which are the product of reacting (1) a functionalized hydrocarbon of less than 500 $M_n$ wherein functionalization comprises at least one group of the formula —CO—Y—$R^3$ wherein Y is O or S; $R^3$ is H, hydrocarbyl, aryl, substituted aryl or substituted hydrocarbyl and wherein at least 50 mol % of the functional groups are attached to a tertiary carbon atom: and (2) a nucleophilic reactant; wherein at least 80% of the functional groups originally present in the functionalized hydrocarbon are derivatized.

The present invention is directed to a dispersant composition for lubricating or fuel oil applications comprising polymers functionalized using the Koch reaction and derivatized using a "heavy polyamine".

The heavy polyamine as the term is used herein contains more than six nitrogens per molecule, but preferably polyamine oligomers containing more than seven nitrogens per molecule. Commercial dispersants are based on the reaction of carboxylic acid moieties with a polyamine such as tetraethylenepentamine (TEPA) with five nitrogens per molecule. Commercial TEPA is a distillation cut and contains oligomers with three and four nitrogens as well. Other commercial polyamines known generically as PAM, contain a mixture of ethylene amines where TEPA and pentaethylene hexamine (PEHA) are the major part of the polyamine, usually about 80%. Typical PAM is commercially available from the Dow Chemical Company under the trade name E-100 or from the Union Carbide Company as HPA-X This mixture typically consists of less than 1.0 wt. % low molecular weight amine, 10–15 wt. % TEPA's, 40–50% PEHA's and the balance hexaethylene heptamine (HEHA) and higher oligomers. Typically PAM has 8.7–8.9 milliequivalents of primary amine per gram and a total nitrogen content of about 33–34 wt. %.

It has been discovered that heavier cuts of PAM oligomers with practically no TEPA and only very small amounts of PEHA but containing primarily oligomers with more than 6 nitrogens and more extensive branching produce dispersants with improved dispersancy when compared to products derived from regular commercial PAM under similar conditions with the same polymer backbones. An example of one of these heavy polyamine compositions is commercially available from the Dow Chemical Company under the trade name of Polyamine HA-2.

HA-2 is prepared by distilling out all the lower boiling ethylene amine oligomers (light ends) including TEPA. The TEPA content is less than 1%. Only a small amount of PEHA, usually 5–15%, remains in the mixture. The rest being higher nitrogen content oligomers with greater degree of branching.

Typical analysis of HA-2 gives primary nitrogen values of 7.8 milliequivalents (meq) of primary amine per gram of polyamine. This calculates to be about an equivalent weight (EW) of 128 grams per equivalent (g/eq). The total nitrogen content is about 32.0–33.0 wt. %. Commercial PAM analyzes for 8.7–8.9 meq of primary amine per gram of PAM and a nitrogen percentage of about 33 to about 34 wt. %.

The present invention uses "heavy" ethylene polyamine which contains primarily oligomers higher than pentaethylene hexamine, to produce dispersants that are superior to dispersants made from conventional PAM which contain lower molecular weight amine oligomers.

DETAILED DESCRIPTION OF THE INVENTION

The present invention relates to a derivatization, using a heavy polyamine of functionalized hydrocarbon polymer wherein the polymer backbone has $M_n \geq 500$, functionalisation is by groups of the formula:

—CO—Y—R$^3$ wherein Y is O or S, and either R$^3$ is H, hydrocarbyl and at least 50 mole % of the functional groups are attached to a tertiary carbon atom of the polymer backbone or R$^3$ is aryl, substituted aryl or substituted hydorcarbyl.

Thus the functionalized polymer may be depicted by the formula:

$$\text{POLY}-(CR^1R^2-Co-Y-R^3)_n \qquad (I)$$

wherein POLY is a hydrocarbon polymer backbone having a number average molecular weight of at least 500, n is a number greater than 0, R$^1$, R$^2$ and R$^3$ may be the same or different and are each H, hydrocarbyl with the proviso that either R$^1$ and R$^2$ are selected such that at least 50 mole % of the —CR$^1$R$^2$ groups wherein both R$^1$ and R$^2$ are not H, or R$^3$ is aryl substituted aryl or substituted hydrocarbyl.

As used herein the term "hydrocarbyl" denotes a group having a carbon atom directly attached to the remainder of the molecule and having predominantly hydrocarbon character within the context of this invention and includes polymeric hydrocarbyl radicals. Such radicals include the following:

(1) Hydrocarbon groups; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, the two indicated substituents may together form a cyclic radical). Such radicals are known to those skilled in the art; examples include methyl, ethyl, butyl, hexyl, octyl, decyl, dodecyl, tetradecyl, octadecyl, eicosyl, cyclohexyl, phenyl and naphthyl (all isomers being included).

(2) Substituted hydrocarbon groups; that is, radicals containing non-hydrocarbon substituents which, in the context of this invention, do not alter predominantly hydrocarbon character of the radical. Those skilled in the art will be aware of suitable substitutents (e.g., halo, hydroxy, alkoxy, carbalkoxy, nitro, alkylsulfoxy).

(3) Hetero groups; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen particularly non-basic nitrogen which would deactivate the Koch catalyst, oxygen and sulfur.

In general, no more than about three substituents or hetero atoms, and preferably no more than one, will be present for each 10 carbon atoms in the hydrocarbon-based radical.

Polymeric hydrocarbyl radicals are those derived from hydrocarbon polymers, which may be substituted and/or contain hetero atoms provided that they remain predominantly hydrocarbon in character.

The functionalized polymer may be derived from a hydrocarbon polymer comprising non-aromatic carbon-carbon double bond, also referred to as an olefinically unsaturated bond, or an ethylenic double bond. The polymer is functionalized at that double via a Koch reaction to form the carboxylic acid, carboxylic ester or thio acid or thio ester.

In the Koch process as practiced herein, a hydrocarbon or low molecular weight hydrocarbon polymer having at least one ethylenic double bond is contacted with an acid catalyst and carbon monoxide in the presence of a nucleophilic trapping agent such as water or alcohol. The catalyst is preferably a classical Bronsted acid or Lewis acid catalyst. These catalysts are distinguished from the transition metal catalysts of the type described in the prior art. The Koch reaction, as applied in the process of the present invention, can result in good yields of functionalized polymer, even 90 mole % or greater.

Koch reactions have not heretofore been applied to polymers having number average molecular weights greater than 500. The hydrocarbon polymer preferably has Mn greater than 1,000. In the Koch process a polymer having at least one ethylenic double bond is contacted with an acid catalyst and carbon monoxide in the presence of a nucleophilic trapping agent such as water or alcohol. The catalyst is preferably a classical Broensted acid or Lewis acid catalyst. These catalysts are distinguishable from the transition metal catalysts of the type described in the prior art. The Koch reaction, as applied to the present invention, may result in good yields of functionalized polymer, even 90 mole % or greater.

POLY, in general formula I, represents a hydrocarbon polymer backbone having Mn of at least 500. Mn may be determined by available techniques such as gel permeation chromatography (GPC).

POLY is derived from unsaturated polymer.

The hydrocarbons and polymers which are useful in the present invention contain at least one carbon-carbon double bond (olefinic or ethylenic unsaturation). Thus, the maximum number of functional groups per molecule (e.g., per polymer chain) is limited by the number of double bonds per molecule. Such hydrocarbons have been found to be receptive to Koch mechanisms to form carboxylic acids or derivatives thereof, using the catalysts and nucleophilic trapping agents of the present invention.

Polymers

The polymers which are useful in the present invention are polymers containing at least one carbon-carbon double bond (olefinic or ethylenic) unsaturation. Thus, the maximum number of functional groups per polymer chain is limited by the number of double bonds per chain. Such polymers have been found to be receptive to Koch mechanisms to form carboxylic acids or derivatives thereof, using the catalysts and nucleophilic trapping agents of the present invention.

Useful polymers in the present invention include polyalkenes including homopolymer, copolymer (used interchangeably with interpolymer) and mixtures. Homopolymers and interpolymers include those derived from polymerizable olefin monomers of 2 to about 16 carbon atoms; usually 2 to about 6 carbon atoms.

Particular reference is made to the alpha olefin polymers made using organo metallic coordination compounds. A particularly preferred class of polymers are ethylene alpha olefin copolymers such as those disclosed in U.S. Pat. No. 5,017,299. The polymer unsaturation can be terminal, internal or both. Preferred polymers have terminal unsaturation, preferably a high degree of terminal unsaturation. Terminal unsaturation is the unsaturation provided by the last monomer unit located in the polymer. The unsaturation can be located anywhere in this terminal monomer unit. Terminal olefinic groups include vinylidene unsaturation, $R^a R^b C = CH^2$; trisubstituted olefin unsaturation, $R^a R^b C = CR^c H$; vinyl unsaturation, $R^a HC = CH_2$; 1,2-disubstituted terminal unsaturation, $R^a HC = CHR^b$; and tetra-substituted terminal unsaturation, $R^a R^b C = CR^c R$. At least one of $R^a$ and $R^b$ is a polymeric group of the present invention, and the remaining $R^b$, $R^c$ and $R^d$ are hydrocarbon groups as defined with respect to R, $R^1$, $R^2$, and $R^3$ above.

Low molecular weight polymers, also referred to herein as dispersant range molecular weight polymers, are polymers having Mn less than 20,000, preferably 500 to 20,000 (e.g. 1,000 to 20,000), more preferably 1,500 to 10,000 (e.g. 2,000 to 8,000) and most preferably from 1,500 to 5,000. The number average molecular weights are measured by vapor phase osmometry. Low molecular weight polymers are useful in forming dispersants for lubricant additives.

Medium molecular weight polymers Mn's ranging from 20,000 to 200,000, preferably 25,000 to 100,000; and more preferably, from 25,000 to 80,000 are useful for viscosity index improvers for lubricating oil compositions, adhesive coatings, tackifiers and sealants. The medium Mn can be determined by membrane osmometry.

The higher molecular weight materials have Mn of greater than about 200,000 and can range to 15,000,000 with specific embodiments of 300,000 to 10,000,000 and more specifically 500,000 to 2,000,000. These polymers are useful in polymeric compositions and blends including elastomeric compositions. Higher molecular weight materials having Mn's of from 20,000 to 15,000,000 can be measured by gel permeation chromatography with universal calibration, or by light scattering. The values of the ratio Mw/Mn, referred to as molecular weight distribution, (MWD) are not critical. However, a typical minimum Mw/Mn value of about 1.1–2.0 is preferred with typical ranges of about 1.1 up to about 4.

The olefin monomers are preferably polymerizable terminal olefins; that is, olefins characterized by the presence in their structure of the group —R—C=CH$_2$, where R is H or a hydrocarbon group. However, polymerizable internal olefin monomers (sometimes referred to in the patent literature as medial olefins) characterized by the presence within their structure of the group:

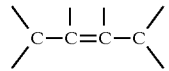

can also be used to form the polyalkenes. When internal olefin monomers are employed, they normally will be employed with terminal olefins to produce polyalkenes which are interpolymers. For this invention, a particular polymerized olefin monomer which can be classified as both a terminal olefin and an internal olefin, will be deemed a terminal olefin. Thus, pentadiene-1,3 (i.e., piperylene) is deemed to be a terminal olefin.

While the polyalkenes generally are hydrocarbon polyalkenes, they can contain substituted hydrocarbon groups such as lower alkoxy, lower alkyl mercapto, hydroxy, mercapto, and carbonyl, provided the non-hydrocarbon moieties do not substantially interfere with the functionalization or derivatization reactions of this invention. When present, such substituted hydrocarbon groups normally will not contribute more than about 10% by weight of the total weight of the polyalkenes. Since the polyalkene can contain such non-hydrocarbon substituent, it is apparent that the olefin monomers from which the polyalkenes are made can also contain such substituents. As used herein, the term "lower" when used with a chemical group such as in "lower alkyl" or "lower alkoxy" is intended to describe groups having up to seven carbon atoms.

The polyalkenes may include aromatic groups and cycloaliphatic groups such as would be obtained from polymerizable cyclic olefins or cycloaliphatic substituted-polymerizable acrylic olefins. There is a general preference for polyalkenes free from aromatic and cycloaliphatic groups (other than the diene styrene interpolymer exception already noted). There is a further preference for polyalkenes derived from homopolymers and interpolymers of terminal hydrocarbon olefins of 2 to 16 carbon atoms. This further preference is qualified by the proviso that, while interpolymers of terminal olefins are usually preferred, interpolymers optionally containing up to about 40% of polymer units derived from internal olefins of up to about 16 carbon atoms are also within a preferred group. A more preferred class of polyalkenes are those selected from the group consisting of homopolymers and interpolymers of terminal olefins of 2 to 6 carbon atoms, more preferably 2 to 4 carbon atoms. However, another preferred class of polyalkenes are the latter, more preferred polyalkenes optionally containing up to about 25% of polymer units derived from internal olefins of up to about 6 carbon atoms.

Specific examples of terminal and internal olefin monomers which can be used to prepare the polyalkenes according to conventional, well-known polymerization techniques include ethylene; propylene; butene-1; butene-2; isobutene; pentene-1; etc.; propylene-tetramer; diisobutylene; isobutylene trimer; butadiene-1,2; butadiene-1,3; pentadiene-1,2; pentadiene-1,3; etc.

Useful polymers include alpha-olefin homopolymers and interpolymers, and ethylene alpha-olefin copolymers and terpolymers. Specific examples of polyalkenes include polypropylenes, polybutenes, ethylene-propylene copolymers, ethylene-butene copolymers, propylene-butene copolymers, styrene-isobutene copolymers, isobutene-butadiene-1,3 copolymers, etc., and terpolymers of isobutene, styrene and piperylene and copolymer of 80% of ethylene and 20% of propylene. A useful source of polyalkenes are the poly(isobutene)s obtained by polymerization of $C_4$ refinery stream having a butene content of about 35 to about 75% by wt., and an isobutene content of about 30 to about 60% by wt., in the presence of a Lewis acid catalyst such as aluminum trichloride or boron trifluoride.

Also useful are the high molecular weight poly-n-butenes of U.S. Ser. No. 992,871 filed Dec. 17, 1992.

A preferred source of monomer for making poly-n-butenes is petroleum feedstreams such as Raffinate II. These feedstocks are disclosed in the art such as in U.S. Pat. NO. 4,952,739.

Ethylene Alpha-Olefin Copolymer

Preferred polymers are polymers of ethylene and at least one alpha-olefin having the formula $H_2C=CHR^4$ wherein $R^4$ is straight chain or branched chain alkyl radical comprising 1 to 18 carbon atoms and wherein the polymer contains a high degree of terminal ethenylidene unsaturation. Preferably $R^4$ in the above formula is alkyl of from 1 to 8 carbon atoms and more preferably is alkyl of from 1 to 2 carbon atoms. Therefore, useful comonomers with ethylene in this invention include propylene, 1-butene, hexene-1, octene-1, etc., and mixtures thereof (e.g. mixtures of propylene and 1-butene, and the like). Preferred polymers are copolymers of ethylene and propylene and ethylene and butene-1.

The molar ethylene content of the polymers employed is preferably in the range of between about 20 and about 80%, and more preferably between about 30 and about 70%. When butene-1 is employed as comonomer with ethylene, the ethylene content of such copolymer is most preferably between about 20 and about 45 wt %, although higher or lower ethylene contents may be present. The most preferred ethylene-butene-1 copolymers are disclosed in U.S. Ser. No. 992,192, filed Dec. 17, 1992. The preferred method for making low molecular weight ethylene/α-olefin copolymer is described in U.S. Ser. No. 992,690, filed Dec. 17, 1992.

Preferred ranges of number average molecular weights of polymer for use as precursors for dispersants are from 500 to 10,000, preferably from 1,000 to 8,000, most preferably from 2,500 to 6,000. A convenient method for such determination is by size exclusion chromatography (also known as gel permeation chromatography (GPC)) which additionally provides molecular weight distribution information.

Such polymers generally possess an intrinsic viscosity (as measured in tetralin at 135° C.) of between 0.025 and 0.6 dl/g, preferably between 0.05 and 0.5 dl/g, most preferably between 0.075 and 0.4 dl/g. These polymers preferably exhibit a degree of crystallinity such that, when grafted, they are essentially amorphous.

The preferred ethylene alpha-olefin polymers are further characterized in that up to about 95% and more of the polymer chains possess terminal vinylidene-type unsaturation. Thus, one end of such polymers will be of the formula POLY-C($R^{11}$)=$CH_2$ wherein $R^{11}$ is $C_1$ to $C_{18}$ alkyl, preferably $C_1$ to $C_8$ alkyl, and more preferably methyl or ethyl and wherein POLY represents the polymer chain. A minor amount of the polymer chains can contain terminal ethenyl unsaturation, i.e. POLY-CH=$CH_2$, and a portion of the polymers can contain internal monounsaturation, e.g. POLY-CH=CH($R^1$ 1), wherein $R^{11}$ is as defined above.

The preferred ethylene alpha-olefin polymer comprises polymer chains, at least about 30% of which possess terminal vinylidene unsaturation. Preferably at least about 50%, more preferably at least about 60%, and most preferably at least about 75% (e.g. 75 to 98%), of such polymer chains exhibit terminal vinylidene unsaturation. The percentage of polymer chains exhibiting terminal vinylidene unsaturation may be determined by FTIR spectroscopic analysis, titration, HNMR, or $C_{13}$NMR.

The polymers can be prepared by polymerizing monomer mixtures comprising ethylene with other monomers such as alpha-olefins, preferably from 3 to 4 carbon atoms in the presence of a metallocene catalyst system comprising at least one metallocene (e.g., a cyclopentadienyl-transition metal compound) and an activator, e.g. alumoxane compound. The comonomer content can be controlled through selection of the metallocene catalyst component and by controlling partial pressure of the monomers.

The polymer for use in the present invention can include block and tapered copolymers derived from monomers comprising at least one conjugated diene with at least monovinyl aromatic monomer, preferably styrene. Such polymers should not be completely hydrogenated so that the polymeric composition contains olefinic double bonds, preferably at least one bond per molecule. The present invention can also include star polymers as disclosed in patents such as U.S. Pat. Nos. 5,070,131; 4,108,945; 3,711,406; and 5,049,294.

The letter n is greater than 0 and represents the functionality (F) or average number of functional groups per polymer chain. Thus, functionality can be expressed as the average number of moles of functional groups per "mole of polymer". It is to be understood that the term "mole of polymer" includes both functionalized and unfunctionalized polymer, so that F which corresponds to n of Formula (I). The functionalised polymer will include molecules having no functional groups. Specific preferred embodiments of n include $1 \geq n > 0$; $2 \geq n > 1$; and $n > 2$. n can be determined by $C^{13}$ NMR. The optimum number of functional groups needed for desired performance will typically increase with number average molecular weight of the polymer. The maximum value of n will be determined by the number of double bonds per polymer chain in the unfunctionalized polymer.

In specific and preferred embodiments the "leaving group" (—$YR^3$) has a pKa of less than or equal to 12, preferably less than 10, and more preferably less than 8. The pKa is determined from the corresponding acidic species HY—$R^3$ in water at room temperature.

Where the leaving group is a simple acid or alkyl ester, the functionalized polymer is very stable especially as the % neo substitution increases.

The present invention is especially useful to make "neo" functionalized polymer which are generally more stable and labile than iso structures. In preferred embodiments the polymer can be at least 60, more preferably at least 80 mole percent neofunctionalised. The polymer can be greater than 90, or 99 and even about 100 mole percent neo.

In one preferred composition the polymer defined by formula (I), Y is O (oxygen), $R^1$ and $R^2$ can be the same or different and are selected from H, a hydrocarbyl group, and a polymeric group.

In another preferred embodiment Y is O or S, $R^1$ and $R^2$ can be the same or different and are selected from H, a hydrocarbyl group a substituted hydrocarbyl group and a polymeric group, and $R^3$ is selected from a substituted hydrocarbyl group, an aromatic group and a substituted aromatic group. This embodiment is generally more reactive towards derivatization with the heavy amines of the present invention especially where the $R^3$ substituent contains electron withdrawing species. It has been found that in this embodiment, a preferred leaving group, $HYR^3$, has a pKa of less than 12, preferably less than 10 and more preferably 8 or less. pKa values can range typically from 5 to 12, preferably from 6 to 10, and most preferably from 6 to 8. The pKa of the leaving group determines how readily the system will react with derivatizing compounds to produce derivatized product.

In a particularly preferred composition, $R^3$ is represented by the formula:

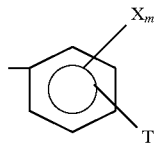

wherein X, which may be the same or different, is an electron withdrawing substituent, T, which may be the same or different, represents a non-electron withdrawing substituent (e.g. electron donating), and m and p are from 0 to 5 with the sum of m and p being from 0 to 5. More preferably, m is from 1 to 5 and preferably 1 to 3. In a particularly preferred embodiment X is selected from a halogen, preferably F or Cl, $CF_3$, cyano groups and nitro groups and p=0. A preferred $R^3$ is derived from 2,4-dichlorophenol.

The composition of the present invention includes the derivatized polymer which is the reaction product of the Koch functionalized polymer and the derivatizing compound (e.g., heavy amine). Derivatized polymer will typically contain at least amide. The suitability for a particular end use may be improved by appropriate selection of the polymer Mn and functionality used in the derivatised polymer as discussed hereinafter.

The Koch reaction permits controlled functionalization of unsaturated polymers. When a carbon of the carbon-carbon double bond is substituted with hydrogen, it will result in an "iso" functional group, i.e. one of $R^1$ or $R^2$ of Formula I is H; or when a carbon of the double bond is fully substituted with hydrocarbyl groups it will result in an "neo" functional group, i.e. both $R^1$ or $R^2$ of Formula I are non-hydrogen groups.

Polymers produced by processes which result in a terminally unsaturated polymer chain can be functionalized to a relatively high yield in accordance with the Koch reaction. It has been found that the neo acid functionalized polymer can be derivatized to a relatively high yield.

The Koch process also makes use of relatively inexpensive materials i.e., carbon monoxide at relatively low temperatures and pressures. Also the leaving group —$YR^3$ can be removed and recycled upon derivatizing the Koch functionalized polymer with the heavy amine.

The functionalized or derivatized polymers of the present invention are useful as lubricant additives such as dispersants, viscosity improvers and multifunctional viscosity improvers.

The present invention includes oleaginous compositions comprising the above functionalized, and/or derivatized polymer. Such compositions include lubricating oil compositions and concentrates.

The invention also provides a process which comprises the step of catalytically reacting in admixture:
(a) at least one hydrocarbon or hydrocarbon polymer having a number average molecular weigh to less than 500 or at least one hydrocarbon polymer having a number average molecular weight of at least about 500, and an average at least one ethylenic double bond per polymer chain;
(b) carbon monoxide,
(c) at least one acid catalyst, and
(d) a nucleophilic trapping agent selected from the group consisting of water, hydroxy-containing compounds and thiol-containing compounds, the reaction being conducted a) in the absence of reliance on transition metal as a catalyst; or b) with at least one acid catalyst having a Hammett acidity of less than –7; or c) wherein functional groups are formed at least 40 mole % of the ethylenic double bonds; or d) wherein the nucleophilic trapping agent has a pKa of less than 12.

The process of the present invention relates to a polymer having at least one ethylenic double bond reacted via a Koch mechanism to form carbonyl or thio carbonyl group-containing compounds, which may subsequently be derivatised. The polymers react with carbon monoxide in the presence of an acid catalyst or a catalyst preferably complexed with the nucleophilic trapping agent. A preferred catalyst is $BF_3$ and preferred catalyst complexes include $BF_3.H_2O$ and $BF_3$ complexed with 2,4-dichlorophenol. The starting polymer reacts with carbon monoxide at points of unsaturation to form either iso- or neo-acyl groups with the nucleophilic trapping agent, e.g. with water, alcohol (preferably a substituted phenol) or thiol to form respectively a carboxylic acid, carboxylic ester group, or thio ester.

In a preferred process, at least one polymer having at least one carbon-carbon double bond is contacted with an acid catalyst or catalyst complex having a Hammett Scale acidity value of less than –7, preferably from –8.0 to –11.5 and most preferably from –10 to –11.5. Without wishing to be bound by any particular theory, it is believed that a carbenium ion may form at the site of one of carbon-carbon double bonds. The carbenium ion may then react with carbon monoxide to form an acylium cation. The acylium cation may react with at least one nucleophilic trapping agent as defined herein.

At least 40 mole %, preferably at least 50 mole %, more preferably at least 80 mole %, and most preferably 90 mole % of the polymer double bonds will react to form acyl groups wherein the non-carboxyl portion of the acyl group is determined by the identity of the nucleophilic trapping agent, i.e. water forms acid, alcohol forms acid ester and thiol forms thio ester. The polymer functionalized by the recited process of the present invention can be isolated using fluoride salts. The fluoride salt can be selected from the group consisting of ammonium fluoride, and sodium fluoride.

Preferred nucleophilic trapping agents are selected from the group consisting of water, monohydric alcohols, polyhydric alcohols hydroxyl-containing aromatic compounds and hetero substituted phenolic compounds. The catalyst and nucleophilic trapping agent can be added separately or combined to form a catalytic complex.

Following is an example of a terminally unsaturated polymer reacted via the Koch mechanism to form an acid or an ester. The polymer is contacted with carbon monoxide or a suitable carbon monoxide source such as formic acid in the presence of an acidic catalyst. The catalyst contributes a proton to the carbon-carbon double bond to form a carbenium ion. This is followed by addition of CO to form an acylium ion which reacts with the nucleophilic trapping agent. POLY, Y, $R^1$, $R^2$ and $R^3$ are defined as above.

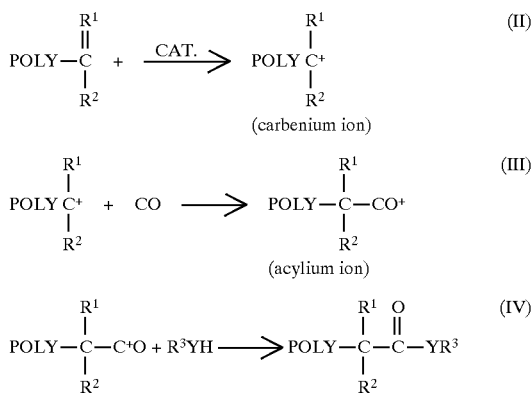

The Koch reaction is particularly useful to functionalize poly(alpha olefins) and ethylene alpha olefin copolymers formed using metallocene-type catalysts. These polymers contain terminal vinylidene groups. There is a tendency for such terminal groups to predominate and result in neo-type (tertiary) carbenium ions. In order for the carbenium ion to form, the acid catalyst is preferably relatively strong. However, the strength of the acid catalyst is preferably balanced against detrimental side reactions which can occur when the acid is too strong.

The Koch catalyst can be employed by preforming a catalyst complex with the proposed nucleophilic trapping agent or by adding the catalyst and trapping agent separately to the reaction mixture. This later embodiment has been found to be a particular advantage since it eliminates the step of making the catalyst complex.

The following are examples of suitable acidic catalyst and catalyst complex materials with their respective Hammett Scale Value acidity: 60% $H_2SO_4$, −4.32; $BF_3.3H_2O$, −4.5; $BF_3.2H_2O$, −7.0; $WO_3/Al_2O_3$, less than −8.2; $SiO_2/Al_2O_3$, less than −8.2; HF, −10.2; $BF_3.H_2O$, −11.4; −11.94; $ZrO_2$ less than −12.7; $SiO_2/Al_2O_3$, −12.7 to −13.6; $AlCl_3$, −13.16 to −13.75; $AlCl_3/CuSO_4$, −13.75 to −14.52.

It has been found that $BF_3.2H_2O$ is ineffective at functionalizing polymer through a Koch mechanism ion with polymers. In contrast, $BF_3.H_2O$ resulted in high yields of carboxylic acid for the same reaction. The use of $H_2SO_4$ as a catalyst involves control of the acid concentration to achieve the desired Hammett Scale Value range. Preferred catalysts are $H_2SO_4$ and $BF_3$ catalyst systems.

Suitable $BF_3$ catalyst complexes for use in the present invention can be represented by the formula:

$$BF_3.xHOR$$

wherein R can represent hydrogen, hydrocarbyl (as defined below in connection with R') —CO—R', —$SO_2$—R', —PO—$(OH)_2$, and mixtures thereof wherein R' is hydrocarbyl, typically alkyl, e.g., $C_1$ to $C_{20}$ alkyl, and, e.g., $C_6$ to $C_{14}$ aryl, aralkyl, and alkaryl, and x is less than 2.

Following reaction with CO, the reaction mixture is further reacted with water or another nucleophilic trapping agent such as an alcohol or phenolic, or thiol compound. The use of water releases the catalyst to form an acid. The use of hydroxy trapping agents releases the catalyst to form an ester, the use of a thiol releases the catalyst to form a thio ester.

Koch product, also referred to herein as functionalized polymer, typically will be derivatized as described hereinafter. Derivatization reactions involving ester functionalized polymer will typically have to displace the alcohol derived moiety therefrom. Consequently, the alcohol derived portion of the Koch functionalized polymer is sometimes referred to herein as a leaving group. The ease with which a leaving group is displaced during derivatization will depend on its acidity, i.e. the higher the acidity the more easily it will be displaced. The acidity in turn of the alcohol is expressed in terms of its pKa.

Preferred nucleophilic trapping agents include water and hydroxy group containing compounds. Useful hydroxy trapping agents include aliphatic compounds such as monohydric and polyhydric alcohols or aromatic compounds such as phenols and naphthols. The aromatic hydroxy compounds from which the esters of this invention may be derived are illustrated by the following specific example: phenol, -naphthol, cresol, resorcinol, catechol, 2-chlorophenol. Particularly preferred is 2,4-dichlorophenol.

The alcohols preferably can contain up to about 40 aliphatic carbon atoms. They may be monohydric alcohols such as methanols, ethanol, benzyl alcohol, 2-methylcyclohexanol, beta-chloroethanol, monomethyl ether of ethylene glycol, etc. The polyhydric alcohols preferably contain from 2 to about 5 hydroxy radicals; e.g., ethylene glycol, diethylene glycol. Other useful polyhydric alcohols include glycerol, monomethyl ether of glycerol, and pentaerythritol. Useful unsaturated alcohols include allyl alcohol, and propargyl alcohol.

Particularly preferred alcohols include those having the formula $R^*_2CHOH$ where an $R^*$ is independently hydrogen, an alkyl, aryl, hydroxyalkyl, or cycloalkyl. Specific alcohols include alkanols such as methanol, ethanol, etc. Also preferred useful alcohols include aromatic alcohols, phenolic compounds and polyhydric alcohols as well as monohydric alcohols such as 1,4-butanediol.

It has been found that neo-acid ester functionalized polymer is extremely stable due, it is believed, to stearic hindrance. Consequently, the yield of derivatized polymer obtainable therefrom will vary depending on the ease with which a derivatizing compound can displace the leaving group of the functionalized polymer.

The most preferred alcohol trapping agents may be obtained by substituting a phenol with at least one electron withdrawing substituent such that the substituted phenol possesses a pKa within the above described preferred pKa ranges. In addition, phenol may also be substituted with at least one non-electron withdrawing substituent (e.g., electron donating), preferably at positions meta to the electron withdrawing substituent to block undesired alkylation of the phenol by the polymer during the Koch reaction. This further improves yield to desired ester functionalized polymer.

Accordingly, and in view of the above, the most preferred trapping agents are phenolic and substituted phenolic compounds represented by the formula:

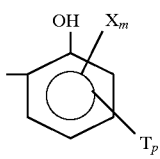

(V)

wherein X, which may be the same or different, is an electron withdrawing substituent, and T which may be the same or different is a non-electron withdrawing group; m and p are from 0 to 5 with the sum of m and p being from 0 to 5, and m is preferably from 1 to 5, and more preferably, m is 1 or 2. X is preferably a group selected from halogen, cyano, and nitro, preferably located at the 2- and/or 4-position, and T is a group selected from hydrocarbyl, and hydroxy groups and p is 1 or 2 with T preferably being located at the 4 and/or 6 position. More preferably X is selected from Cl, F, Br, cyano or nitro groups and m is preferably from 1 to 5, more preferably from 1 to 3, yet more preferably 1 to 2, and most preferably 2 located at the 2 and 4 locations relative to —OH.

The relative amounts of reactants and catalyst, and the conditions controlled in a manner sufficient to functionalize typically at least about 40, preferably at least about 80, more preferably at least about 90 and most preferably at least about 95 mole % of the carbon-carbon double bonds initially present in the unfunctionalized polymer.

The amount of $H_2O$, alcohol, or thiol used is preferably at least the stoichiometric amount required to react with the acylium cations. It is preferred to use an excess of alcohol over the stoichiometric amount. The alcohol performs the dual role of reactant and diluent for the reaction. However, the amount of the alcohol or water used should be sufficient to provide the desired yield yet at the same time not dilute the acid catalyst so as to adversely affect the Hammett Scale Value acidity.

The polymer added to the reactant system can be in a liquid phase. Optionally, the polymer can be dissolved in an inert solvent. The yield can be determined upon completion of the reaction by separating polymer molecules which contain acyl groups which are polar and hence can easily be separated from unreacted non-polar compounds. Separation can be performed using absorption techniques which are known in the art. The amount of initial carbon-carbon double bonds and carbon-carbon double bonds remaining after the reaction can be determined by $C^{13}$ NMR techniques.

In accordance with the process, the polymer is heated to a desired temperature range which is typically between −20° C. to 200° C., preferably from 0° C. to 80° C. and more preferably from 40° C. to 65° C. Temperature can be controlled by heating and cooling means applied to the reactor. Since the reaction is exothermic usually cooling means are required. Mixing is conducted throughout the reaction to assure a uniform reaction medium.

The catalyst (and nucleophilic trapping agent) can be prereacted to form a catalyst complex or are charged separately in one step to the reactor to form the catalyst complex in situ at a desired temperature and pressure, preferably under nitrogen. In a preferred system the nucleophilic trapping agent is a substituted phenol used in combination with $BF_3$. The reactor contents are continuously mixed and then rapidly brought to a desired operating pressure using a high pressure carbon monoxide source. Useful pressures can be up to 138000 kPa (20,000 psig), and typically will be at least 2070 kPa (300 psig), preferably at least 5520 kPa (800 psig), and most preferably at least 6900 kPa (1,000 psig), and typically will range from 3450 to 34500 kPa (500 to 5,000 psig) preferably from 4485 to 20700 kPa (650 to 3,000 psig) and most preferably from 4485 to 13800 kPa (650 to 2000 psig). The carbon monoxide pressure may be reduced by adding a catalyst such as a copper compound. The catalyst to polymer volume ratio can range from 0.25 to 4, preferably 0.5 to 2 and most preferably 0.75 to 1.3.

Preferably, the polymer or hydrocarbon or low molecular weight polymer catalyst, nucleophilic trapping agent and CO are fed to the reactor in a single step. The reactor contents are then held for a desired amount of time under the pressure of the carbon monoxide. The reaction time can range up to 5 hours and typically 0.5 to 4 and more typically from 1 to 2 hours. The reactor contents can then be discharged and the product which is a Koch functionalized polymer comprising either a carboxylic acid or carboxylic ester or thiol ester functional groups separated. Upon discharge, any unreacted CO can be vented off. Nitrogen can be used to flush the reactor and the vessel to receive the polymer.

Depending on the particular reactants employed, the functionalized polymer containing reaction mixture may be a single phase, a combination of a partitionable polymer and acid phase or an emulsion with either the polymer phase or acid phase being the continuous phase.

Upon completion of the reaction, the polymer is recovered by suitable means.

When the mixture is an emulsion, a suitable means can be used to separate the polymer. A preferred means is the use of fluoride salts, such as sodium or ammonium fluoride in combination with an alcohol such as butanol or methanol to neutralize the catalyst and phase separate the reaction complex. The fluoride ion helps trap the $BF_3$ complexed to the functionalized polymer and helps break emulsions generated when the crude product is washed with water. Alcohols such as methanol and butanol and commercial demulsifiers also help to break emulsions especially in combination with fluoride ions. Preferably, nucleophilic trapping agent is combined with the fluoride salt and alcohols when used to separate polymers. The presence of the nucleophilic trapping agent as a solvent minimizes tranesterification of the functionalized polymer.

Where the nucleophilic trapping agent has a pKa of less than 12 the functionalized polymer can be separated from the nucleophilic trapping agent and catalyst by depressurization and distillation. It has been found that where the nucleophilic trapping agent has lower pKa's, the catalyst, i.e. $BF_3$ releases more easily from the reaction mixture.

As indicated above, polymer which has undergone the Koch reaction is also referred to herein as functionalized polymer. Thus, a functionalized polymer comprises molecules which have been chemically modified by at least one functional group so that the functionalised polymer is (a) capable of undergoing further chemical reaction (e.g. derivatization) or (b) has desirable properties, not otherwise possessed by the polymer alone, absent such chemical modification.

It will be observed from the discussion of formula I that the functional group is characterized as being represented by the parenthetical expression

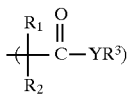

which expression contains the acyl group

It will be understood that

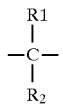

moiety is not added to the polymer in the sense of being derived from a separate reactant it is still referred to as being part of the functional group for ease of discussion and description. Strictly speaking, it is the acyl group which constitutes the functional group, since it is this group which is added during chemical modification. Moreover, $R_1$ and $R_2$ represent groups originally present on, or constituting part of, the 2 carbons bridging the double bond before functionalization. However, $R_1$ and $R_2$ were included within the parenthetical so that neo acyl groups could be differentiated from iso acyl groups in the formula depending on the identity of $R_1$ and $R_2$.

Typically, where the end use of the polymer is for making dispersant, e.g. as derivatized polymer, the polymer will possess dispersant range molecular weights (Mn) as defined hereinafter and the functionality will typically be significantly lower than for polymer intended for making derivatized multifunctional V.I. improvers, where the polymer will possess viscosity modifier range molecular weights (Mn) as defined hereinafter.

Accordingly, while any effective functionality can be imparted to functionalized polymer intended for subsequent derivatization, it is contemplated that such functionalities, expressed as F, for dispersant end uses, are typically not greater than about 3, preferably not greater than about 2, and typically can range from about 0.5 to about 3, preferably from 0.8 to about 2.0 (e.g. 0.8 to 1).

Similarly, effective functionalities F for viscosity modifier end uses of derivatized polymer are contemplated to be typically greater than about 3, preferably greater than about 5, and typically will range from 5 to about 10. End uses involving very high molecular weight polymers contemplate functionalities which can range typically greater than about 20, preferably greater than about 30, and most preferably greater than about 40, and typically can range from 20 to 60, preferably from 25 to 55 and most preferably from 30 to 50.

The functionalized hydrocarbon or polymer can be used as a dispersant if the functional group contains the requisite polar group. The functional group can also enable the hydrocarbon to participate in a variety of chemical reactions. Derivatives of functionalized hydrocarbons can be formed through reaction of the functional group. These derivatized hydrocarbons may have the requisite properties for a variety of uses including use as dispersants. A derivatized hydrocarbon is one which has been chemically modified to perform one or more functions in a significantly improved way relative to the unfunctionalized hydrocarbon and/or the functionalized hydrocarbon. Representative of such functions is dispersancy in lubricating oil compositions.

The derivatized compound typically contains at least one reactive derivatizing group selected to react with the functional groups of the functionalized hydrocarbon by various reactions. Representative of such reactions are nucleophilic substitution, transesterification, salt formation, and the like. The derivatizing compound preferably also contains at least one additional group suitable for imparting the desired properties to the derivatized hydrocarbon, e.g., polar groups, at least one of the following groups: amide, imide, oxazoline, ester, and metal salt.

Derivatization by Heavy Amines

Novel dispersants of the present invention are based on the α-olefin and ethylene/α-olefin polymers as disclosed in U.S. Ser. No. 972,192 and incorporated herein by reference. These polymers can be functionalized via "ene" reaction, phenol alkylation or carbonylation via the Koch reaction. The Koch reaction is disclosed in U.S. Ser. No. 992,403 and is incorporated herein by reference. It has been found that the amine segment of the dispersant is very critical both to product performance of neo-amide dispersants and to the amination process of hindered phenyl esters.

Typical disclosures of polyamine reactants for the preparation of lubricant dispersants teach a range of nitrogens per molecule of from 1–12, a variety of spacing groups between the nitrogens, and a range of substitution patterns on the amine groups. We have discovered that dispersants derived from the preferred compositions described below exhibit surprisingly enhanced dispersancy and/or viscometric properties relative to the prior art.

Specifically, one embodiment of this invention comprises oil-soluble derivatized compositions of $C_2$–$C_{18}$ α-olefin polymers or copolymers, functionalized with neo-acid/ester groups, further reacted with polyamines which contain >28% N, more preferably >30% N, e.g. >32% N, and an equivalent weight of primary amine groups of between 120–160 g/eq, more preferably 120–150 g/eq, e.g. 125–140 g/eq. Best results are obtained when the polyamines contain more than 6 nitrogen atoms per molecule on the average (more preferably >7. e.g. >8 nitrogen atoms per molecule), and more than two primary nitrogens per molecule on the average (preferably >2.2, e.g. >2.4). The ideal spacings between the nitrogens are $C_2$–$C_3$ with $C_3$ preferred at the terminal ends of the polyamine.

Polyamines with these characteristics are commercially available and can be produced by distilling out the tetraethylenepentamine and most of the pentaethylenehexamine from standard polyethyleneamine mixtures. Alternatively, they could be synthesized by cyanoethylation of the primary amine groups of polyethylene or polypropylene pentamines or hexamines followed by hydrogenation.

Preferred polymer compositions are those derived from olefins of structure $RHC=CH_2$ where R is H or a hydrocarbon substituent containing from $C_1$ to $C_{16}$ with at least 30% of the olefin moieties comprising vinylidene groups.

As the molecular weight of a dispersant backbone is increased, the polar segment of the molecule becomes the limiting factor in dispersancy performance with polyamine systems of the prior art such as triethylenetetramine and tetraethylenepentamine. Increasing the stoichiometric ratio of amine to polymer raises the nitrogen content, but results in significant levels of free unreacted polyamine which is detrimental to diesel engine and elastomer seal performance. The novel preferred compositions allow the benefit of the higher hydrodynamic volumes of high molecular weight dispersant backbones to be realized without the debit of limited degree of polymerization of the backbone increases above 25 (especially above 40, e.g. above 50).

Conversion of olefin polymers to neo-acids and esters is described in U.S. Ser. No. 992,403. Derivatizations to neoamides could be carried out under standard conditions at temperatures of 150°–220° C. as described in U.S. Ser. No. 992,403. An alternative method is to carry out the reaction to 95+% yield, and then add a volatile amine such as dimethylaminopropylamine in excess to complete the reaction. The excess amine is then removed by distillation. This process has the advantage of reducing the overall cycle time because second order reactions slow down considerably at the tail end of the reaction unless one of the reactants is present in excess. The small amount of ester (5%) not converted to a high nitrogen dispersant can often be neglected.

A preferred process is the one described in commonly assigned copending application U.S. Ser. No. 261,507, filed this date herewith (Attorney Docket No. PT-1143) where low pressure is used to drive the reaction to completion by removing the leaving group being displaced during amination. The low volatility of the preferred polyamine compositions are particularly suited for this latter process. More volatile polyamines distill to some extent at the low pressures and high temperatures used in the reaction, and are not as suitable.

For example, a commercial polyamine with equivalent weight (EW) of primary amine of 115 and 33.5% N with an average of about 6 nitrogen atoms per molecule exhibits 2.5% wt. loss at 100° C. in a thermal gravimetric analysis experiment (heating rate of 5° C./min.). One of the preferred compositions of this invention (EW-130, 32.8% N, with >7 nitrogens per molecule) yields less than 1% wt. loss even at 200° C.

Generally, the amine employed in the reaction mixture is chosen to provide at least an equal number of equivalents of primary amine per equivalent of ester groups in the functionalized hydrocarbon polymer. More particularly, the total amount of amine charged to the mixture typically contains about 1 to 10, preferably about 1 to 6, more preferably about 1.1 to 2, and most preferably about 1.1 to 1.5 (e.g., 1.2 to 1.4) equivalents of primary amine per equivalent of ester groups. The excess of primary amine groups is intended to assure substantially complete conversion of the ester groups to amides.

In the process of the invention, the reaction between the functionalized hydrocarbon polymer containing ester groups (i.e., substituted alkyl ester functional groups and/or aryl ester functional groups) and the heavy polymer amine is carried out for a time and under conditions sufficient to form amide groups on the functionalized polymer with the concomitant release of hydroxy compound.

Dispersants

Dispersants maintain oil insolubles, resulting from oil use, in suspension in the fluid thus preventing sludge flocculation and precipitation. Suitable dispersants include, for example, dispersants of the ash-producing (also known as detergents) and ashless type, the latter type being preferred. The derivatized polymer compositions of the present invention, can be used as ashless dispersants and multifunctional viscosity index improvers in lubricant and fuel compositions.

Post Treatment

The derivatised polymers may be post-treated. U.S. Ser. No. 992,403 discloses processes for post treatment and is incorporated herein by reference.

Lubricating Compositions

The additives of the invention may be used by incorporation into an oleaginous material such as fuels and lubricating oils. U.S. Ser. No. 992,403 discloses the use of the additive derived from the present invention in fuels and lubricating oils and is incorporated herein by reference.

The present invention will be further understood by the following examples which include preferred embodiments. In the following examples $\overline{M}_n$ and the ethylene content of the polymers were determined by carbon-13 NMR.

EXAMPLES

The following examples are representative of polymers functionalized via the Koch reaction and derivatized using heavy polyamine (HA-2).

Example 1

An ethylene/butene copolymer (46% ethylene, Mn=3300) prepared via Ziegler-Natta polymerization with zirconium metallocene catalyst and methyl alumoxane cocatalyst according to known procedures was carbonylated with carbon monoxide in the present of $BF_3$ and 2,4-dichlorophenol in a continuous stirred tank reactor at 50° C. The resulting ester was aminated with a prior art polyamine of 34.3% N and an equivalent weight of primary amine of 111 using a stoichiometry of 1.2 equivalents of primary amine per equivalent of ester by heating for 14–20 hours at 150°–230° C. under reflux and then removing the phenol given off by distillation. The product was diluted with base oil and borated using 7.9 parts of a 30% boric acid slurry in base oil, 118.6 parts of aminated polymer and 98 parts of base oil at 1 50° C for 1–2 hours.

After filtration, the product contained 0.52% N and 0.18% B.

Example 2

Another dispersant was prepared from the same functionalized polymer described in Example 1 by reacting with a polyamine of the present invention having 32.4% N and an equivalent weight of primary amine of 129 using a stoichiometry of 1.2 equivalents of primary amine per equivalent of ester. The amine was added to the ester at 220° C. over a period of three hours and the reaction mixture was soaked for three hours at 220° C. Excess dimethylaminopropylamine (1.5 equivalent per equivalent of original ester) was then added and the reaction mixture was soaked for a further three hours and then stripped to remove the excess amine. The product was diluted with base oil, and borated as above with 11.2 parts of a 30% boric acid slurry per 140 parts of aminated polymer and 110.4 parts of base oil to give a product containing 0.57% N and 0.26% B after filtration.

Example 3

Another dispersant was prepared from an ethylene/butene copolymer (35% ethylene, Mn=4000) which was carbonylated to a dichlorophenyl ester in a batch reactor. Amination was performed with a polyamine of the present invention of 32.8% N and equivalent weight of primary amine of 131 using a stoichiometry of 1.4 equivalents of primary amine per equivalent of ester 300° C. for 8 hours at a pressure of 24 mm removing the phenol as it formed. Last traces of phenol were distilled by stripping for an additional hour with nitrogen at 200° C. at atmospheric pressure. The product was diluted and borated using 1.33 parts of a 30% boric acid slurry in base oil, 16.4 parts of aminated polymer and 13.5 parts of base oil as above yielding a product containing 0.72% N and 0.21% B.

Example 4

A dispersant was prepared from an ethylene/butylene copolymer (51% E, Mn=5500) which was carbonylated to a dichlorophenyl ester as in Example 7. Amination was performed with the same polyamine and stoichiometry as Example 7 at 200° C. for 12 hours at a pressure of 2–4 mm. After stripping residual phenol for an additional hour with nitrogen, the product was diluted with 1.1 parts of base oil per part of aminated polymer and filtered to give a product with 0.48% N.

Examples 5–6

Two 5W30 oils were formulated incorporating the dispersants of Example 1 and Example 2 along with the detergents, antioxidants, anti-wear agents, etc. typically used in a passenger car motor oil. The same additive components and treat rates of active ingredient were used in each case except that in Oil A the dispersant of Example 1 was used and in Oil B the dispersant of Example 2 was used. The dispersant in Oil B was also blended at a reduced concentration relative to that of Oil A (95%). The kinematic viscosities at 100° C. and the ccs viscosities at −25° C. were then adjusted to equivalent values by adjusting the amount of ethylene propylene viscosity modifier and base stock. Despite the fact that Oil B contained less active dispersant than Oil A, it required less viscosity modifier (92%) to reach the same kinematic viscosity target.

Examples 7–8

The two oils of Examples 5–6 were compared in the standard ASTM sequence V-E engine test which is an industry measure of dispersant performance. Oil B, despite having less dispersant, equaled or exceeded the performance of Oil A in every category related to dispersant performance:

| OIL | AV SLUDGE | PSV | AV VARNISH |
|---|---|---|---|
| A | 9.0 | 6.7 | 5.8 |
| B | 9.0 | 7.2 | 6.1 |

Average sludge, piston skirt varnish (PSV) and average varnish are merit ratings with the larger numbers being better.

Table 1 shows results of experimental dispersants derived from heavy amine in a typical SAE 10W30 lubricant oil formulation using Exxon basestocks. When compared to a reference oil the formulations tested showed a marked improvement in both sludge and varnish performance as measured in the ASTM Sequence V-E engine test. Average Sludge, Varnish and Piston Skirt Varnish are merit ratings with the larger numbers being better. In addition, the results demonstrated this improved performance at equal or reduced treat rates from the reference. Using the experimental dispersant the viscosity modifier treat rate as required to meet SAE 10W30 visiometric targets was also reduced.

TABLE 1

SAE 10W30 LUBRICATING OIL USING EXXON BASESTOCKS

| Dispersant Type | Comparative Reference | Example A Experimental with Heavy Polyamine | Example B Experimental with Heavy Polyamine | Example C Experimental with Heavy Polyamine |
|---|---|---|---|---|
| Dispersant Treat Rate @ 50% AI Mass % | 5.77 | 5.77 | 4.62 | 5.17 |
| V-E Engine Test Results | | | | |
| Avg. Sludge | 9.07 | 9.43 | 9.47 | 9.41 |
| Avg. Varnish | 5.12 | 6.74 | 6.75 | 6.72 |
| Piston Skirt Varnish | 6.68 | 6.95 | 6.68 | 7.06 |
| Viscosity Modifier Required Mass % | 6.0 | 2.0 | 1.5 | 2.0 |
| Kinematic Viscosity @ 100° C. | 10.45 | 10.39 | 10.60 | 10.81 |
| Cold Cranking Simulator (CCS) @ −20° C. | 3249 | 3276 | 3262 | 3376 |

What is claimed is:

1. A process for producing a hydrocarbon having functional groups of the formula —CO—Y—$R^3$ wherein each Y is independently O or S, and each $R^3$ is independently H, hydrocarbyl, substituted hydrocarbyl, aryl, or substituted aryl, derivatized with a heavy polyamine, said process comprising the steps of reacting
   (a) at least one hydrocarbon;
   (b) carbon monoxide;
   (c) at least one acid catalyst having a Hammett acidity of less than −7; and
   (d) a nucleophilic trapping agent selected from the group consisting of water, hydroxy-containing compounds and thiol-containing compounds, the reaction being conducted in the absence of reliance on transition metal as catalyst; optionally wherein the nucleophilic trapping agent has a pKa of less than 12, to form a functionalized hydrocarbon; and
   derivatizing said functionalized hydrocarbon with a heavy polyamine comprising a mixture of polyamines having 6 to 12 nitrogens per molecule, an average of 7 or more nitrogens per molecule, a nitrogen content of at least 28 wt. % and an equivalent weight of about 120 to about 160 grams per equivalent of primary amine.

2. The process of claim 1 wherein the nucleophilic trapping agent is halophenol.

3. The process of claim 1 wherein said heavy polyamine has a primary amine content of about 7.8 meq primary amine per gram and a total nitrogen content of at least about 32 wt. %.

4. The process of claim 1 wherein said heavy polyamine comprises less than about 1 wt. % pentamines and lower polyamines, and less than about 25 wt. % hexamines.

5. The process of claim 1 wherein said heavy polyamine has an equivalent weight of about 125–140.

6. The process of claim 5, wherein said heavy polyamine comprises substantially no oxygen.

7. A dispersant comprising a reaction product of a functionalized hydrocarbon and a heavy polyamine, said heavy polyamine comprising a mixture of polyamines having 6 to 12 nitrogens per molecule, an average of 7 or more nitrogens per molecule, a nitrogen content of at least 28 wt. % and an equivalent weight of about 120 to about 160 grams per equivalent of primary amine.

8. The dispersant of claim 7 wherein said heavy amine has a primary amine content of about 7.8 meq primary amine per gram, and a total nitrogen content of at least about 32 wt. %.

9. The dispersant of claim 7 wherein said heavy polyamine comprises less than about 1 wt. % pentamines and lower polyamines, and less than about 25 wt. % hexamines.

10. The dispersant of claim 7 comprising a functionalized polymer derivatized with a heavy polyamine.

* * * * *